March 30, 1965 T. A. INSOLIO 3,175,745
GLASS BREAKER
Filed March 15, 1963 7 Sheets-Sheet 1

INVENTOR.
Thomas A. Insolio
BY Webb, Mackey & Burden
HIS ATTORNEYS

INVENTOR.
Thomas A. Insolio
BY
Webb, Mackey & Burden
HIS ATTORNEYS

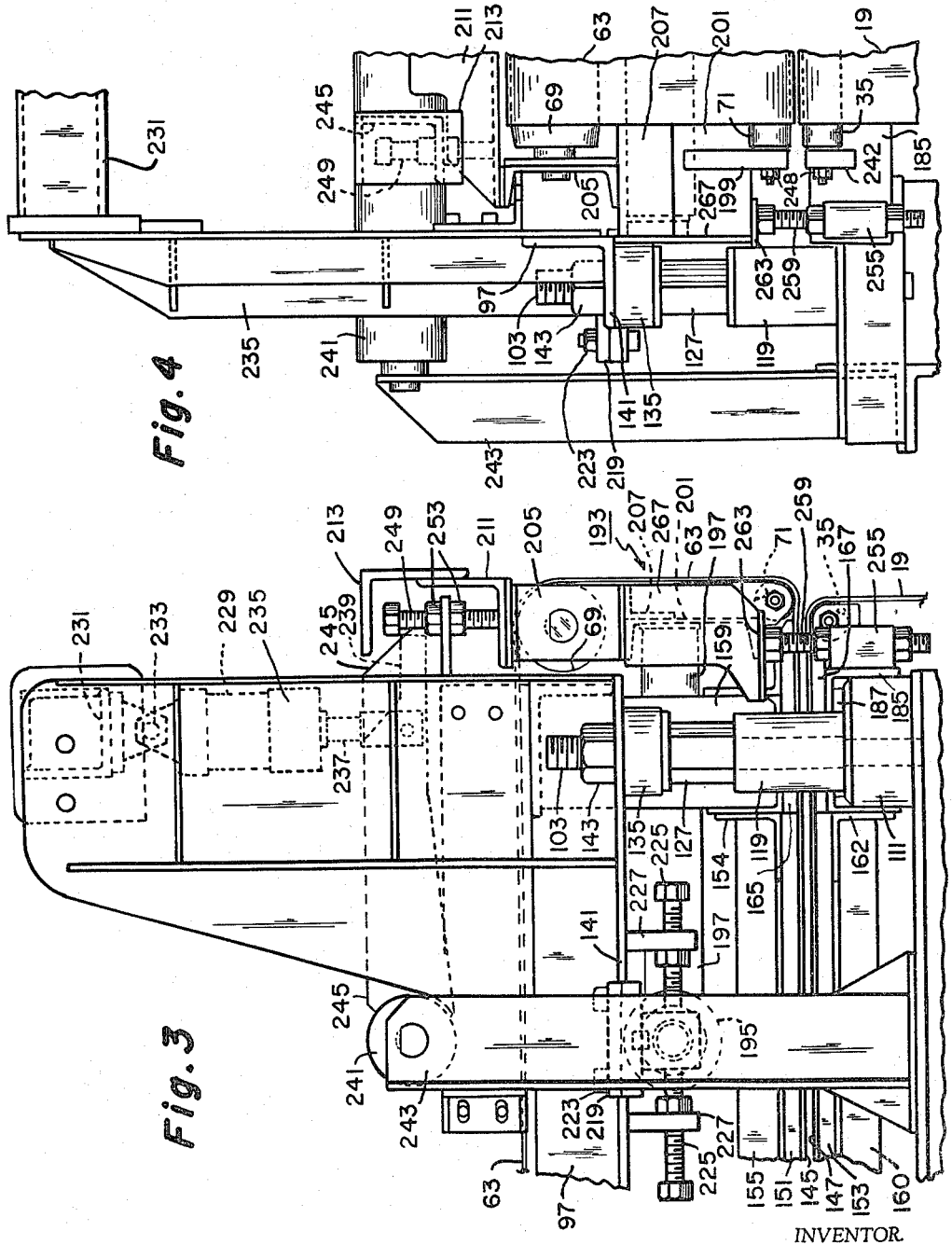

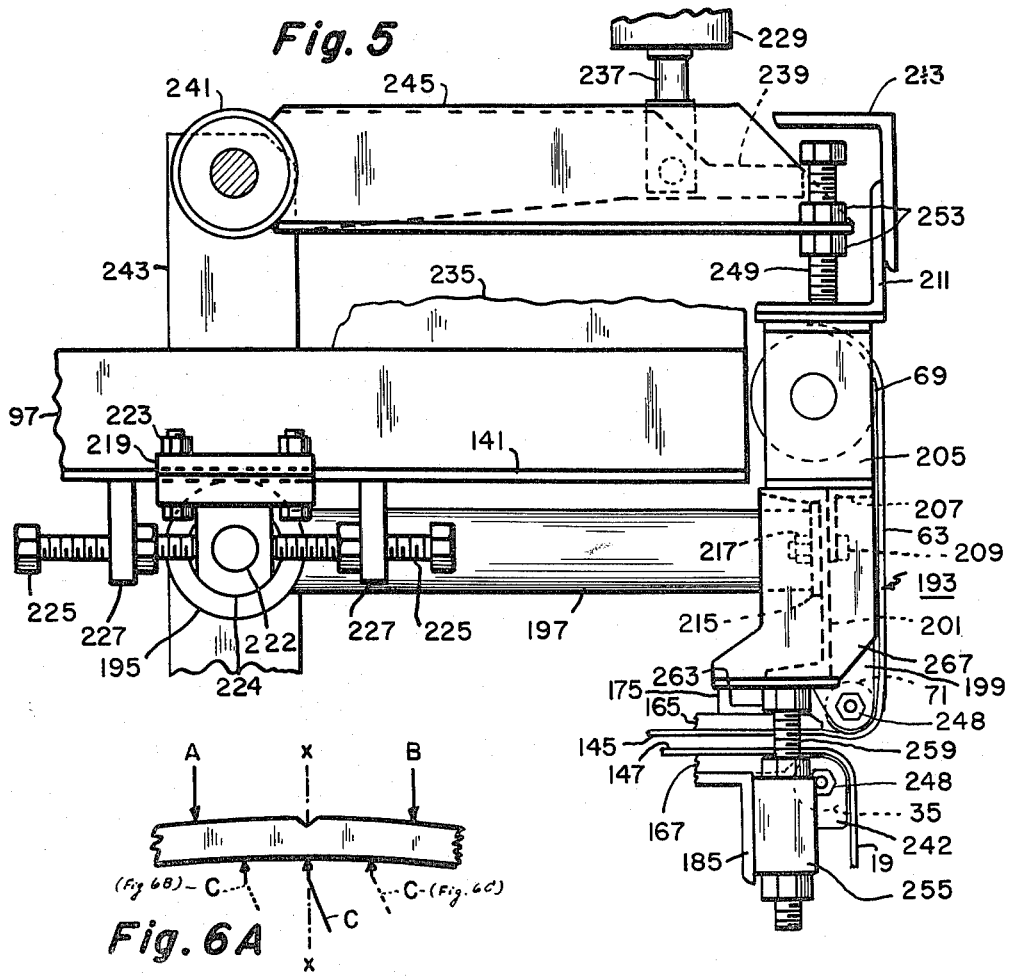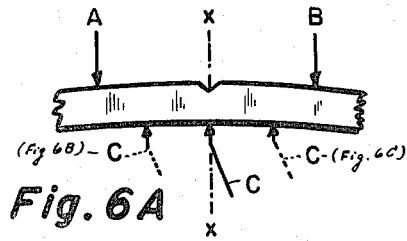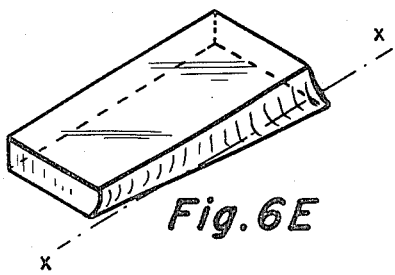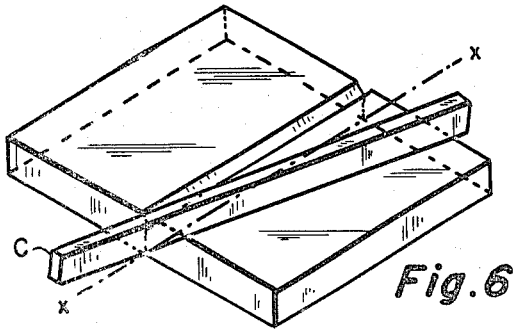
INVENTOR.
Thomas A. Insolio
HIS ATTORNEYS

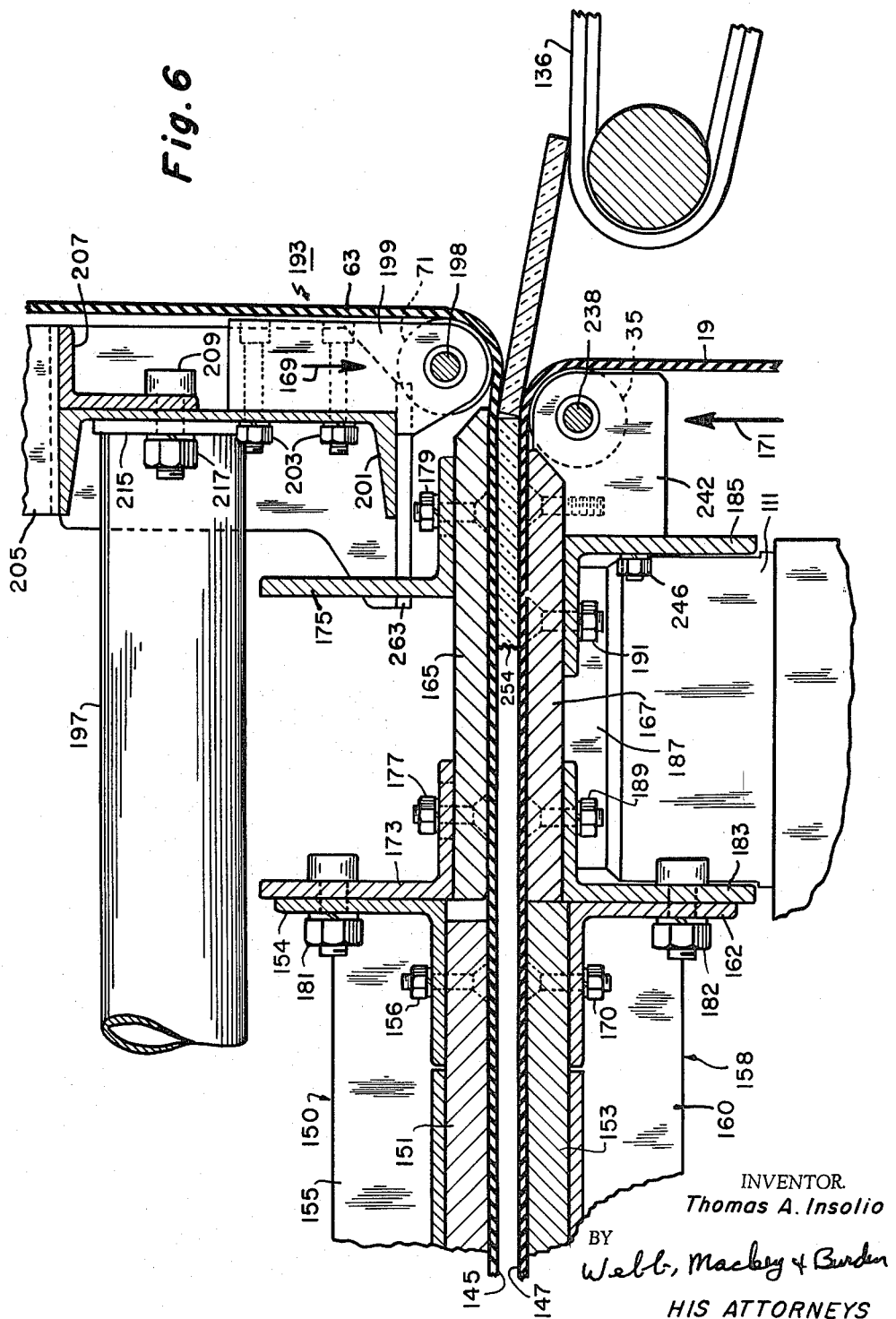

INVENTOR.
Thomas A. Insolio
BY
Webb, Mackey & Burden
HIS ATTORNEYS

March 30, 1965     T. A. INSOLIO     3,175,745
GLASS BREAKER
Filed March 15, 1963     7 Sheets-Sheet 7
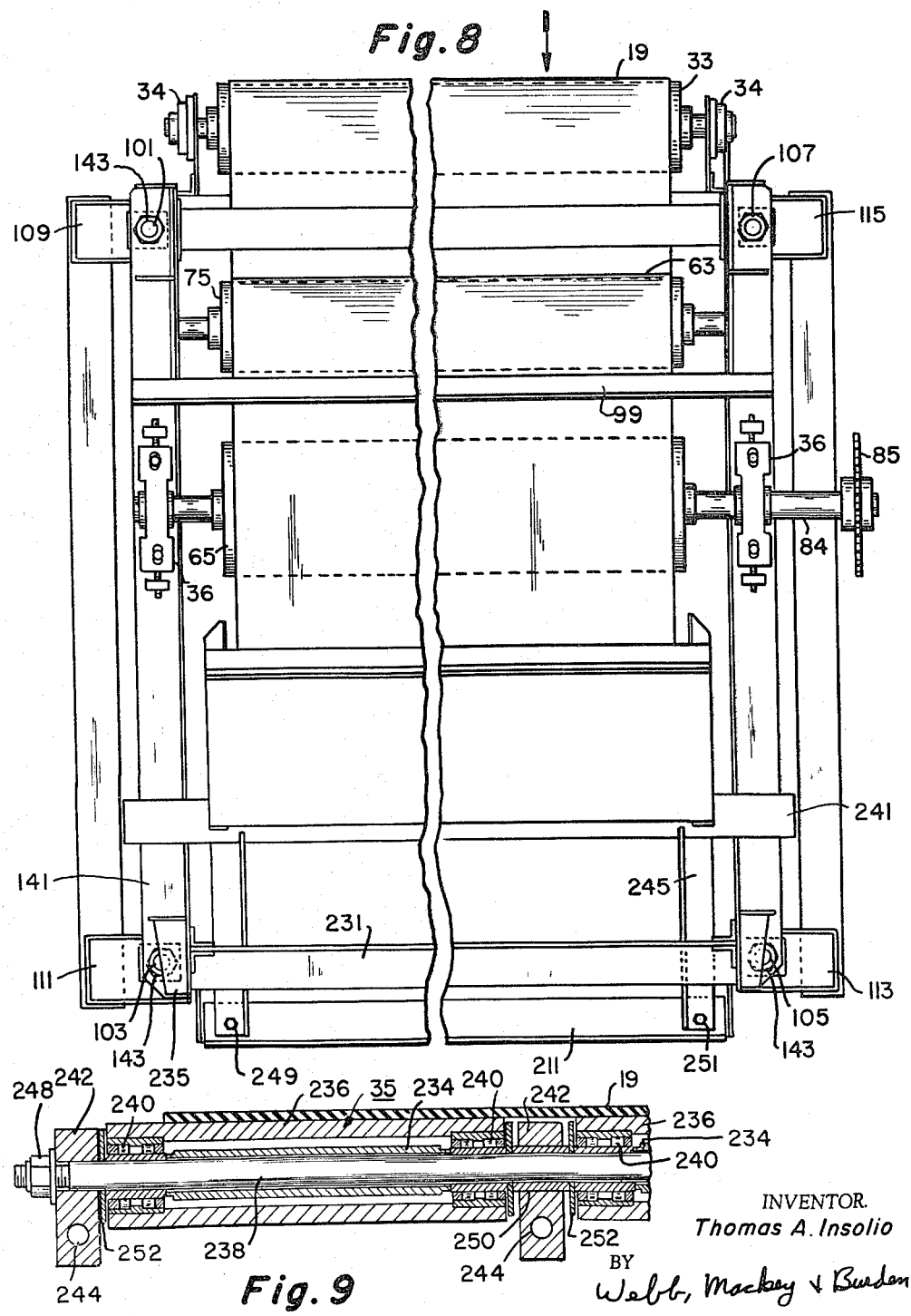
INVENTOR.
Thomas A. Insolio
BY
Webb, Mackey & Burden
HIS ATTORNEYS

3,175,745
GLASS BREAKER
Thomas A. Insolio, Jeannette, Pa., assignor to American-Saint Gobain Corporation, Kingsport, Tenn., a corporation of Delaware
Filed Mar. 15, 1963, Ser. No. 265,407
19 Claims. (Cl. 225—96.5)

This invention relates to improvements in glass breaking and relates in particular to a new and useful glass breaking machine that is ideally suited for automatic glass handling systems.

In the manufacture of glass sheets, an endless sheet of glass is continuously drawn from a glass making machine. Apparatus is provided in the drawing machine to cut the endless sheets at predetermined intervals into large sheets commonly called stock sheets. The stock sheets are then cut into pieces of preselected sizes. In a large glass producing plant a very large number of different sized pieces is cut each day from a large variety of stock sheets. The planning, scheduling and processing of the large number of different sized pieces is a very complex operation.

A major economic factor encountered in the cutting of stock sheets is to obtain the best yield of usable pieces of glass from a given sized stock sheet and yet supply the desired sized pieces of glass. This requires decision making in the planning and scheduling phases to obtain the optimum use of the glass sheet. Such optimum use most often requires that a plurality of different sizes be cut from a given stock sheet. It is readily apparent that another limiting factor in the processing and cutting of glass sheets is the speed at which the stock sheets can be processed and cut into smaller sheets or pieces of preselected sizes. This is especially true where frequent scheduled changes in size are necessary. Manual hand cutting and handling of glass sheets is a slow method and yet this method is still extensively employed in many major producing plants.

A complete system consisting of primary and secondary glass processing lines is fully described in my copending patent application entitled "Method and Apparatus for Cutting, Transporting and Distributing Glass Sheets," Serial No. 235,932, filed November 7, 1962. In this system, stock sheets are indexed, scored transversely, and conveyed through a breaker which breaks the sheet along the score lines to form cross-strips of varying preselected widths, which are then transferred to various secondary conveyors for further similar scoring and breaking steps to produce the final predetermined glass product.

One prerequisite with any system, of which the apparatus of the present invention is a component, that depends on a high rate of speed for its productivity, is the proper timing of the various components in the system, i.e., the cutting component, the breaking component, the take-away conveyor and the distributing conveyor, so that sheets or pieces produced therefrom travel or flow as a smooth stream through all of the components.

Automatic systems for breaking scored glass sheets or strips conventionally include transverse breaker rollers mounted on a conveyor over which the scored glass sheets are conveyed. The transverse breaker rollers are frequently mechanically disposed to raise vertically when the transverse score lines imposed on the glass sheet or strip by the cutting machine pass over the breaker rollers. The weight of the glass on either side of the score mark causes the glass to bend and break along the score mark. Such glass breaking apparatus is not satisfactory for high speed processing lines such as are referred to in my aforementioned copending patent application since the speed of the line makes it impractical to provide such mechanism particularly where a clean straight broken edge is a requirement. Also, since the weight of the glass varies in accordance with its gauge and size, such glass breakers are not adaptable to an apparatus and method such as are taught in my copending patent application. Additionally, separate mechanisms must be employed to trim small sections, as narrow as 2″. It may be desirable to break out such narrow sections from the body of the sheet, and it is frequently desirable to remove such narrow strips from the leading and trailing edges of the strips or sheets.

My glass breaker is capable of breaking sheets or strips of any length or width up to a maximum for which the apparatus is designed. This apparatus may be set for gauge and breaking pressure and will break the glass accurately and cleanly along the transverse score lines regardless of the position of the transverse score line along the length of the glass, including score lines intended for trimming the leading or trailing edge of the sheet. Also, in employing my apparatus, it is not necessary that the score line be absolutely parallel with the breaking rolls. No devices for determining or measuring the sheet for predetermined score lines are required so that as long as the score lines are accurately indexed across the width of the sheet in accordance with the desired size, they will be cleanly broken as they pass through my breaker and the broken edges will be square.

Glass is conventionally broken by bending the glass in the vicinity of the score line. As will be explained in fuller detail hereinbelow, FIGURE 6A through FIGURE 6E show the principles generally employed by glass breaking apparatus. As shown by FIGURE 6A of the drawings, force is conventionally applied in at least one of three places, A, B and C, so as to bend the glass in the manner shown. If the force or reactant C is properly aligned beneath the score line (line X—X), a relatively clean, square break is attained.

The bending moment required to break the sheet at a score line depends on many factors such as the depth of the score, the thickness of the sheet, the type of glass, the "hardness" or annealed state, the "age" of the score (elapsed time from scoring to breaking), and many other such factors. It is difficult to establish a mathematical expression for this "breaking moment" because of the large number of variables. Tests do indicate that the clockwise and counterclockwise torques about the score line (X—X) have to be equal to each other at the instant of the break. The applied or reactive forces at A or B vary inversely as the distance A-C or C-B, respectively.

Where the reactant C is not squarely positioned beneath the transverse score line (see FIGURE 6D), a flared break is obtained (see FIGURE 6E). Glass sheets often lack uniformity in hardness and softness. This phenomenon has a decided effect on flaring or lack of flaring so that glass may have a tendency to flare where a bending moment is applied.

My glass breaker is designed to break out sheets from a stock sheet or cross-cut strip which is moving at high speed (about 120 feet per minute) and my machine will not only break out randomly (but transversely) scored sheeets or strips, but will effect more consistently non-flared breaks than the prior known devices that rely on a bending moment such as shown by FIGURE 6A.

It is the object of the present invention to provide a method and means for breaking scored glass sheets or strips accurately along their score lines as they are moving.

It is a further object of the present invention to provide a glass breaking machine that is capable of automatically breaking transversely scored sheets or strips of glass which are moving at high speed.

A still further object is to provide a method and means for automatically breaking transversely scored sheets or strips which are moving at high speed although the score lines may vary in frequency of occurrence.

It is also an object of the present invention to provide a glass breaking machine capable of receiving scored sheets or strips of glass in a high speed processing line and breaking said sheets of glass accurately and squarely along their score lines, and conveying said sheets to subsequent processing apparatus in such high speed apparatus.

It is further an object of the present invention to provide a glass breaking machine that will automatically and accurately break scored glass sheets or strips of a width less than the maximum width which the machine was designed to accommodate.

Other objects and advantageous features of the present invention will be obvious from the following description and the drawings, wherein:

FIGURE 3 is an enlarged side elevation view of the upper front portion of the apparatus of FIGURE 1, shown as broken away;

FIGURE 4 is an enlarged broken-away front elevation view of a portion of the apparatus of FIGURES 1 and 2;

FIGURE 5 is an enlarged fragmentary elevation view of the torque arm assembly and the pivot mounting of the upper breaker roll of the apparatus of FIGURE 1;

FIGURE 6 is an enlarged fragmentary sectional view of the delivery end of the apparatus of FIGURE 1 showing scored and broken glass sheets being delivered to the receiving end of a take-away conveyor;

FIGURES 6A through 6E are fragmentary and illustrative views of glass panels depicting the method by which scored sheets or panes of glass are broken;

FIGURE 8 is a top elevation view of the apparatus of FIGURE 1; and

FIGURE 9 is a fragmentary cross-sectional view of a broken-away portion of the breaker roller of the apparatus of FIGURE 1.

Figure 1:
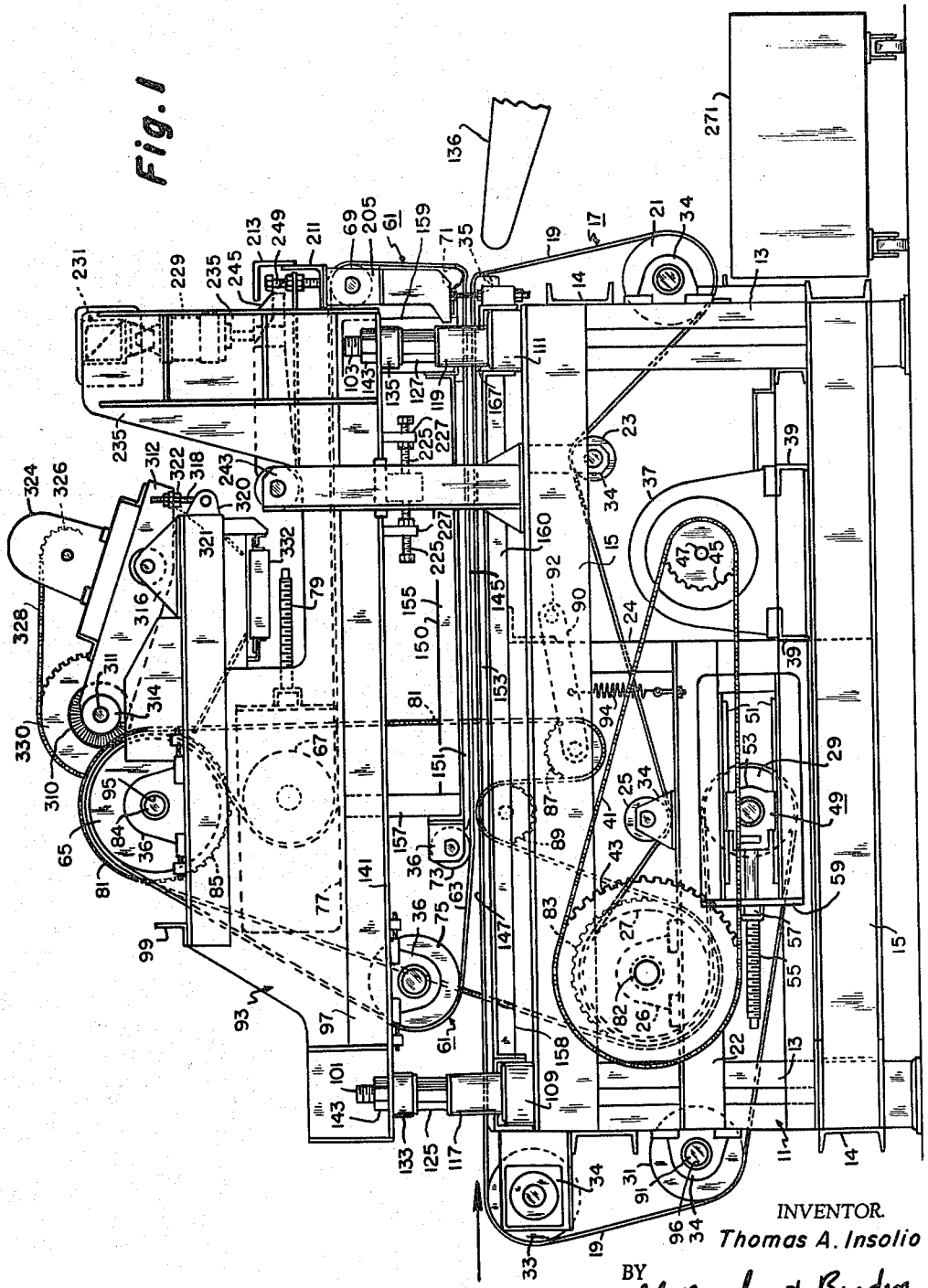
FIGURE 1 is a side elevation view of a breaker apparatus embodying the features of the present invention.

The breaker apparatus as depicted in FIGURES 1 through 9 is composed of a supporting frame 11 made up of upright members 13 and cross beams 14 and 15. There is mounted on the frame 11 an endless belt conveyor 17 which consists of a belt 19 fabricated from a heavy fabric or similar resilient material mounted on rolls or pulleys 21, 23, 25, 27, 29, 31 and 33 and a breaker roller 35. A driving means consisting of a motor 37 is mounted on the cross beams 39 attached to and supported by beams 15 of frame 11. A drive chain 41 delivers driving power to a sprocket 43 from the drive sprocket 45 which is rigidly attached to the drive shaft 47 of the motor 37. Sprocket 43 drives the roll 27 to effect a driving motion to the conveyor 17 in the direction of the arrow. The conveyor belt 19 is maintained at a constant preset tension by means of a take-up apparatus 49 constructed in conjunction with roll or pulley 29.

It will be noted that the take-up apparatus 49 is supported by cross beam 15 of the frame 11 and supporting beams 22 and 24 which support the roll housing 26 of roll 27. Take-up apparatus 49 is constructed so as to support parallel rails 51 which support the roll housing 53 of the roll 29 therebetween in a sliding relationship. A take-up screw 55 is rotatably secured to the housing 53 while being threadedly engaged with a nut 57 which is rigidly attached to a retaining member 59 forming a part of the frame of the take-up apparatus 49. Hence, tension on the belt 19 may be easily controlled by proper rotation of the screw 55 to cause the housing 53 to travel along the rails 51.

Figure 2:
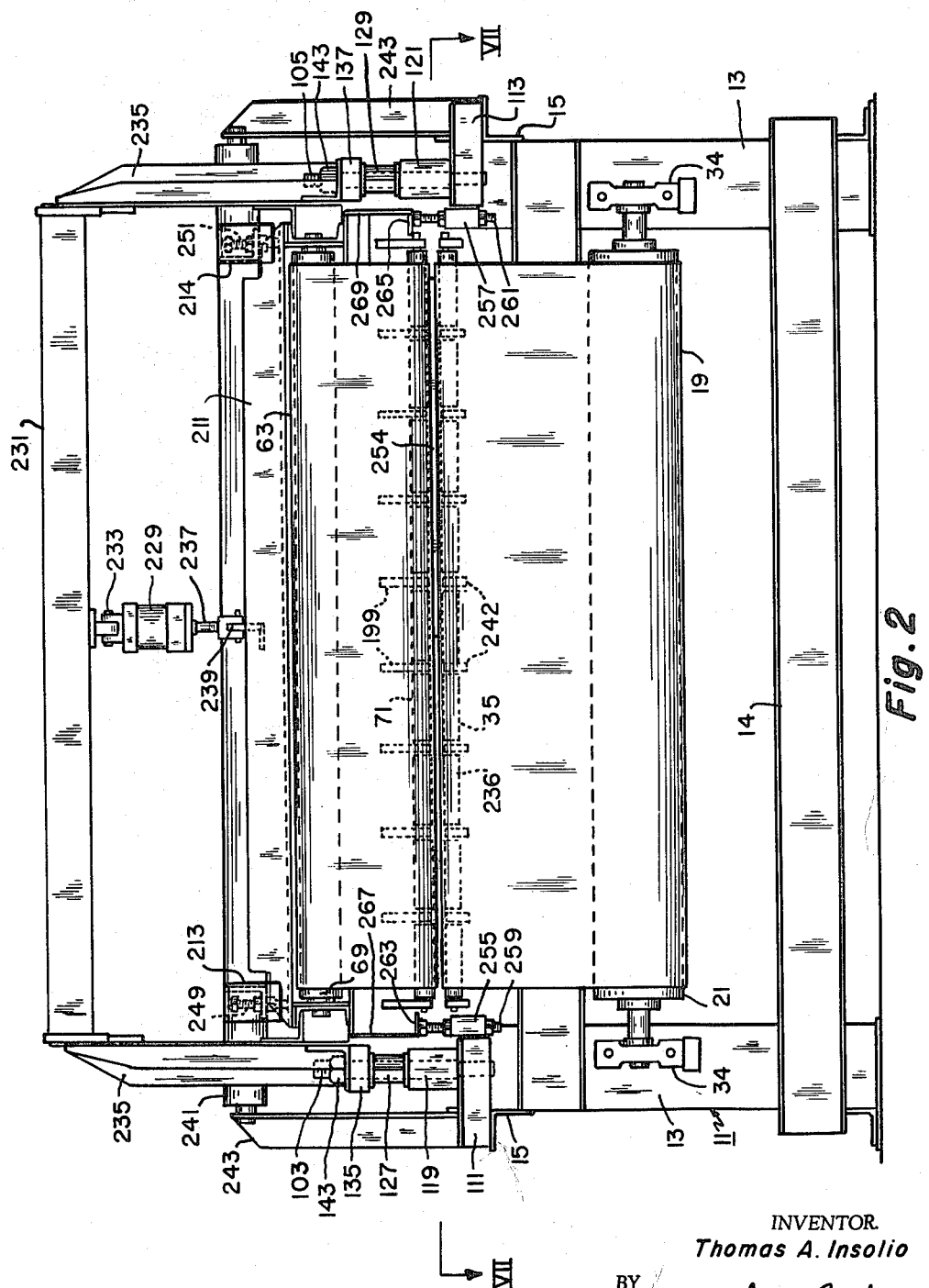
FIGURE 2 is a front elevation view of the apparatus of FIGURE 1.
Figure 7:
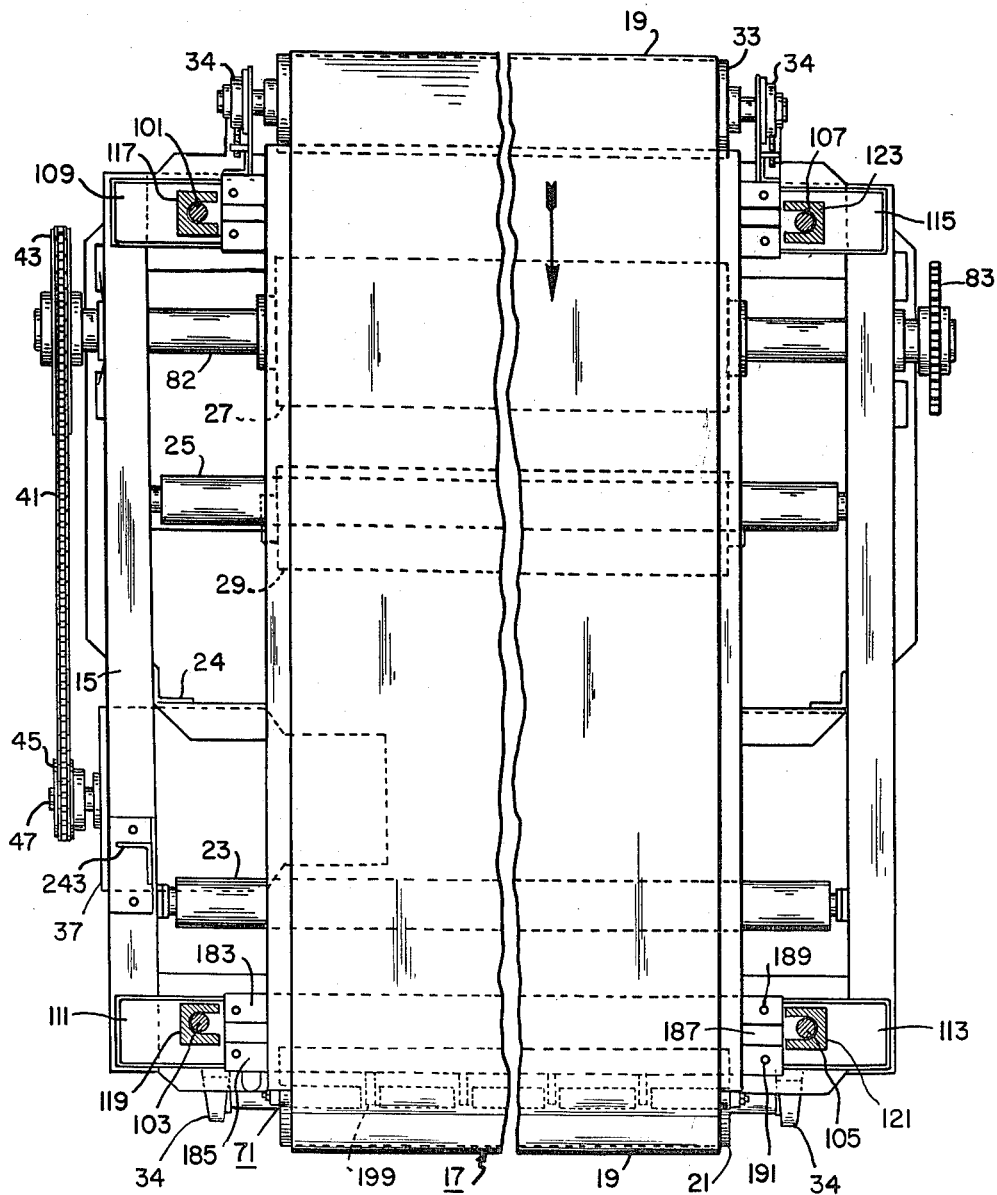
FIGURE 7 is a top sectional view of the apparatus of FIGURES 1 and 2, as taken along the line VII—VII of FIGURE 2.

There is also mounted on the frame 11 a glass retaining or guide conveyor 61 which consists of an endless belt 63 mounted on a series of rolls 65, 67, 69, 73 and 75 and breaker roller 71 (see FIGURES 1 and 2). A take-up apparatus 77 (similar to take-up apparatus 49) is provided in conjunction with roll 67 (details of which, except for screw members 79, are not shown).

A drive chain 81 connects sprocket 83 to sprocket 85. Sprocket 83 is rigidly attached to shaft 82 of roll 27 which is driven by the sprocket 43 and sprocket 85 is rigidly attached to shaft 84 of roll 65 so that when motor 37 drives the conveyor 17 through sprockets 45 and 43 and drive chain 41, it also drives the guide conveyors 61 by means of sprockets 83 and 85 and drive chain 81.

It will be noted that conveyor belt 63 will be driven in an opposite direction and at equal speed to conveyor belt 19 (since sprockets 83 and 85 are substantially the same size) so that where the surfaces of these belts face one another they are driven in the same direction at the same speed.

The drive chain 81 is also provided with appropriate take-up means consisting of an idler sprocket 89 and sprocket 87 which is mounted on a pivot arm 90 (shown in dotted relief in FIGURE 1) which is pivotally mounted to the frame 11 as at 92. Arm 90 is urged downwardly by a spring 94. Drive chain 81 passes over idler sprocket 89 and pivotally mounted sprocket 87 so that spring 94 urges sprocket 87 downwardly to provide constant tension on the drive chain 81.

The belt conveyor 17 is, as has been shown, supported by the rolls 21, 23, 25, 27, 29, 31, 33 and 35. Rolls 21, 23, 25, 31 and 33 are appropriately mounted on mounting members 34 that are rigidly attached to the cross members 14 and 15 and upright members 13 of the frame 11 and rotate on shafts such as shaft 91 of roll 31 and are provided with appropriate bearing surfaces 96. As described above, take-up roll 29 is mounted to the roll housing 53 and roll 27 is mounted to mounting member 26. The manner in which breaker roll 35 is mounted will be described in detail hereafter.

The guide conveyor 61 as shown above, rotates on rolls 65, 67, 69, 71, 73 and 75, which are rotatably secured to a vertically adjustable secondary frame 93 positioned above and supported by frame member 11. The rolls 65, 67, 73 and 75 of conveyor 61 are similarly rotatably mounted on the secondary frame 93 on roll mounting members 36 as the rolls of conveyor 17 are mounted on mounted members 34 so that they may rotate freely in bearing surfaces such as shown at 95 for roll 65.

The secondary frame 93 consists of longitudinal and transverse structural members such as beams 97 and 99 and side panels 235, and is supported above the frame 11 by means of four threaded shafts 101, 103, 105 and 107 that are positioned at the four corners of the frame 11. The threaded shafts 101, 103, 105 and 107 are rigidly secured to plates 109, 111, 113, and 115, respectively, (which are mounted on and supported by the frame 11) and project upwardly to support the secondary frame 93. Horseshoe spacers 117, 119, 121 and 123, respectively, project around threaded shafts 101, 103, 105 and 107. Adjusting nuts 125, 127, 129 and 131 and spacers 133, 135, 137 and 139, respectively, are projected onto and threaded onto threaded shafts 101, 103, 105 and 107 between the secondary frame 93 and frame 11. The threaded shafts appropriately project through openings in the flanges 141 of the longitudinal supporting beams 97 and the extensions thereof and are held rigidly to secondary frame 93 by appropriately threaded nuts such as shown at 143. The construction of the horseshoe spacers 117, 119, 121 and 123 is particularly discernible in FIGURE 7. If the plates 109, 111, 113 and 115 are positioned in a manner so as to be accurately level, it may be readily seen that the distance between the upper and lower adjoining faces 145 and 147 of the retaining conveyor 61 and the conveyor 17 can be controlled by replacing the horseshoe spacers with those of uniformly greater or lesser length. Adjustment of the horseshoe spacers is of particular importance and significance in spacing parallel plates 165 and 167 mounted to the frames 93 and 11, respectively (see FIGURE 3). The purpose and function of plates 165 and 167 will be explained in greater detail herebelow.

In the operation of the apparatus of FIGURES 1 through 9, such apparatus will be normally positioned in a conveyor line possessing glass cutting or scoring units. Such apparatus is identified in my copending patent application entitled "Method and Apparatus for Cutting, Transporting and Distributing Glass Sheets," Serial No. 235,932, filed November 7, 1962, as breaker 30. The glass sheets are usually conveyed onto the conveyor 17 from a conveyor to the left of the apparatus as shown by FIGURE 1. This apparatus is identified in the aforementioned copending application as cutting machine 22. Hence, the glass sheet will be projected onto the belt 19 in the vicinity of the roller 33. This sheet will already have been scored by the glass cutter 22 and the present apparatus is designed to break the sheet along its score lines as it is being conveyed onto a take-away conveyor such as is illustrated in FIGURE 1 as 136 and the aforementioned copending patent application as 36. Accordingly, the scored glass sheet will pass along the top surface of the conveyor 17 and between conveyor 17 and guide conveyor 61 between the belts 63 and 19. The breaker rolls are rolls 71 and 35 and their exact positioning and functioning will be described in fuller detail herebelow. However, in the present description, it will be appreciated that the glass must be transported by the belt 19 of the conveyor 17 while being held in place by the belt 63 of the guide conveyor 61 as it approaches the breaker rolls. Consequently, the belts 63 and 19 are spaced and supported. There is provided spacer members identified as upper spacer member 151 and lower spacer member 153. Spacer members 151 and 153 are generally fabricated from materials such as Masonite, plastics, etc.

The upper spacer member 151 is bolted to and supported by a frame 150, as shown at 156 (FIGURE 6). Frame 150 consists of longitudinal beams 155 and cross beams 154 and is suspended beneath the frame 93 by downwardly depending support members 157 and 159 (FIGURE 1).

It should, of course, be noted that the frame 150 also supports roller 73 of guide conveyor 61.

The lower spacer member 153 is bolted to and supported by a frame 158 (as at 170, see FIGURE 6). The frame 158 is constructed of longitudinal beams 160 and cross beams 162 (see FIGURE 6). The frame 158 is bolted to cross beams 183, as at 182 (FIGURE 6). Cross beams 183 are, in turn, supported by a plate 187 that is supported by plates 111 and 113. The frame 158 is supported similarly above cross beam 15 of frame 11 on plates 109 and 115.

The cutting and breaking of scored glass sheets, and particularly window glass, in a high speed automatic system requires techniques not essential to manual, semiautomatic or low speed systems. As stated above, the techniques of breaking glass all apply the same basic principle. The sheet is broken by bending it about a line parallel to and below the scored line. FIGURES 6A through 6E illustrate this principle. A bending moment must be developed along the score line X—X. This may be accomplished by applying a force C along the line X—X as shown in FIGURE 6A which is resisted by reactions A and B. The force may be applied at A with B and C being the reactions, or the force may be applied at B with A and C being the reactions. Additionally, the force could be applied at both A and B with C being the single reaction. The objective is, of course, the same, which is to develop a moment about the line X—X so that glass is in tension and tensile force is applied at right angles to the score.

To obtain a good square break, particularly with sheets ⅛″ or thicker, the applied force (or reaction) C must be at the line X—X. If C is not coincident with the line X—X, then the edge will flare toward C when the break is made. FIGURES 6B and 6C show the possible result when the force C is not coincident with the line X—X. Additionally, as the force C is applied to the scored sheet, it constitutes a line across the sheet beneath the score line. If the force or reaction C crosses the score line, the resultant break may well flare in both directions (see FIGURES 6D and 6E).

In the present apparatus, I have had particular success in obtaining straight and uniform breaks by employing breaker rolls, as B and C and a steel plate as A. A second steel plate is used as a holding and retaining member in conjunction with the breaker rolls and plate in the manner shown particularly in FIGURE 6. Breaker rolls 71 correspond to force B, breaker roll 35 corresponds to reactant C and plate 165 corresponds to reactant A. Plate 167 is positioned immediately adjacent and "upstream" from reactant C or breaker roll 35.

The function of plates 165 and 167 is to prevent a flexing or resilient bending action of the glass during the application of the breaking force similar to that shown for the glass sheet depicted in FIGURE 6A. Accordingly, plate 167 is positioned adjacent to and "upstream" from the breaker roll 35 at least within several inches of the breaker roll and preferably immediately adjacent.

The vertical axis or center line originating with the axis of the breaker rolls 71 and 35 are the points at which forces or reactants B and C are applied. These forces are illustrated by the arrows 169 and 171 of FIGURE 6. It is to be noted that the upper plate 165 preferably extends to or slightly over the center line of the lower breaker roll 35. The center line of reactant A (plate 165) is a point of speculation, but obviously will be slightly "upstream" from the arrow 171.

Plate 165 is rigidly attached to the upper frame and in the present embodiment it is shown to be bolted to cross beams 173 and 175 as shown at 177 and 179. The cross beam 173 is bolted to the beams 154 of frame 150 as shown at 181 and beams 173 and 175 are attached to the downwardly depending supporting members 159 (see FIGURE 3).

Plate 167 is bolted to supporting beams 183 and 185 that are rigidly mounted on frame 11, being attached to a plate 187 spanning plates 111 and 113. The plates 165 and 167 may be unbolted and removed from the apparatus and replaced by similar plates of greater or lesser gauge to accommodate greater or lesser gauge glass being processed through the breaking apparatus.

Adjustment of the distance between plate 165 and 167 may be controlled with a high degree of accuracy by removing and replacing the horseshoe spacers 117, 119, 121 and 123 with spacers of greater or lesser predetermined thickness. Consequently, adjustment for the gauge of glass to be broken is accomplished in this manner.

In the apparatus of the present invention, the upper breaker roll 71 is mounted in a roll assembly 193 on the secondary frame 93 in a manner to permit independent vertical motion of the upper breaker roll in respect to the frame 93. This roll assembly 193 can move vertically by pivoting about pivot bearings. Consequently, the roll is self-adjusting to the thickness of the sheet, pressure is applied continuously to the breaker roll 71, and the break can occur only when the scored line is directly in a vertical line above the breaker roll 35 (reactant C) because the sheet is not permitted to bend by the plates 165 and 167 prior to this occurrence. Note in particular FIGURES 5 and 6 wherein it is shown that the breaker roll 71 is mounted in a roll assembly shown generally at 193 that is disposed to roll about a torque bar 195 on levers 197.

The breaker roll 71 is composed of a series of rollers mounted between supporting members 199. The supporting members 199 are, in turn, bolted to a cross beam 201 as shown at 203 (FIGURE 6). The mounting frame 205 (FIGURE 5) on which the roll 69 is mounted is attached to the upper end of the beam 201. An additional support for mounting frame 205 is supplied by angle 207 which is bolted to beam 201 as shown at 209 (FIGURE 6).

Attached to the top of the mounting frame 205 near the center thereof are two angle beam members 211 and 213, the function of which will be described hereafter.

The roll assembly 193 consisting of the rolls 71, supporting members 199, cross beam 201, roll 69, mounting frames 205, etc. are pivotally mounting to torque bar 195. Horizontally positioned lever arms 192 are rigidly attached at one end to the torque bar 195 and are provided with flanges 215 at their other ends to which the beam 201 is bolted, as shown at 217. The torque bar 195 is rotatably mounted to torque bar pivot clamps 219 by means of end shafts 222 that extend into suitable perforations of depending portions 224 of one segment of clamps 219. Clamps 219 are clamped to flanges 141 of side beams 97 of the secondary frame 93. The clamps 219 are tightly secured to the flange 141 by means of bolts as shown at 223. From the above constructions, it may be seen that the pivot assembly 193 is not rigidly supported by the secondary frame 93 but may pivot vertically on the lever arms 197 about torque bar 195 which is rotatably attached to the secondary frame 93. The exact position and alignment of the breaker roll 71 can be controlled by means of jack screws 225 which are threadedly mounted in the threaded apertures of downwardly depending supports 227 that are rigidly attached to the beam 97 and which bear on the clamp assemblies 219. Accordingly, breaker roll 71 may be accurately adjusted inwardly or outwardly by loosening clamps 219 and adjusting jack screws 225.

It is important that the pressure applied by the upper breaker rolls 71 be applied continuously and uniformly across the sheet. The exact pressure must be controlled so that the downward pressure may be suitably adjusted in accordance with the thickness and strength of the glass being processed. If the application of force to the breaker roll 71 (force B) is applied directly to the assembly, considerable difficulty would be encountered where a sheet was being processed which is less than half as wide as the belt. Flared breaks often occur with this type of breaking, when pressure is not applied uniformly across the sheet. If greater pressure is applied to one side of the sheet because of its narrower width, the break will occur prematurely on that side and since the sheet continues to move, the reactant C is applied in the manner shown by FIGURE 6D. FIGURE 6E shows a typical flared break of this type. If pressure is not applied uniformly, the bottom will be flared in where the breaking force is greater than average. Inasmuch as the glass sheet being processed is frequently of less width than the breaker rolls 71 and 35, this problem is of considerable consequence in the automatic processing of glass sheets. Means are provided in the apparatus of FIGURES 1 through 9 to control the application of force to the upper breaker roll assembly. This means applies the force to either or both ends of the upper breaker roll assembly. In this respect, attention is particularly directed to FIGURES 2 through 5 wherein it is shown that a pneumatic cylinder 229 is pivotally mounted on a cross beam 231, as shown at 233. The cross beam 231 is mounted to upwardly projecting side members 235 of the secondary frame 93 and the plunger 237 of pneumatic cylinder 229 is connected to a tongue 239 that is, in turn, rigidly connected to a torque bar 241 so that the extension or retraction of the plunger 237 will cause the torque bar 241 to rotate in a clockwise or counterclockwise direction, respectively. Torque bar 241 is rotatably mounted to and suspended from the frame 11 by means of two upwardly projecting arms 243 that are rigidly attached to the cross beams 15 of frame 11. Rigidly connected to torque bar 241 and extending forward therefrom are two arms 245 and 247. Near the forward end of each of the arms 245 and 247 and in threaded engagement with a threaded orifice of each of these arms there are bolts 249 and 251. Bolts 249 and 251 are shown to be positioned in a manner to bear on cross beam 211 of the roll assembly 193 (FIGURE 5). It should be noted that the ends of arms 245 and 247 and their respective bolts 249 and 251 are positioned between the horizontal leg of beam 211 and the horizontal legs of beams 213 and 214 respectively. Accordingly, the bolts 249 and 251 will bear on roll assembly 193 when the cylinder 229 is caused to extend its plunger 237. However, the reverse is accomplished when cylinder 229 is caused to retract its plunger 237, since the heads of the bolts 249 and 251 will bear on beams 213 and 214 to remove or lessen downward force on roll assembly 193. The bolts 249 and 251 are threadedly engaged with arms 245 and 247 so that they may be adjusted vertically to apply equal downward force to beam 211 when the plunger 237 is extended or upward force on beams 213 and 214 when plunger 237 is retracted. If it is desired to assert downward force on one side only of roll assembly 193, the bolts 249 and 251 may be vertically adjusted so that one depends further than the other and is caused to bear on beam 211. Conversely, the bolts 249 and 251 may be adjusted so that one bears on beam 213 or 214 in advance of the other when plunger 237 is retracted. In this manner, the pressure of the breaker roll 71 may be more accurately controlled since the downward or upward pressure is applied on either end and this may be regulated by vertically positioning the bolts 249 and 251. As shown in FIGURE 5, the bolts 249 and 251 may be locked into position by opposing nuts as shown at 253.

Attention is directed to FIGURE 2 where there is shown a sheet of glass 254 passing between the breaker rolls 71 and 35 that does not extend the full width of the belts 19 and 63, or more importantly the total width of the breaker rolls 71 and 35. Greater pressure can be brought to bear on the right side of the apparatus by increasing the length of bolt 251 and/or decreasing the length of bolt 249. The pneumatic cylinder 229 may be activated then to effect a predetermined pressure to be applied to the member 211 of the breaker roll assembly 193 to the right side of the apparatus to compensate for the fact that the width of the glass is less than the width of the breaker rolls and avoid consequent flaring.

It will be additionally appreciated that beam members such as 213 (FIGURE 5) may be mounted to beam 211 so as to extend over the tongue 239. In this manner, the weight of the breaker roll assembly 193 may be reduced in a uniform manner by retracting the plunger 237 of cylinder 229. However, such arrangement is not as versatile as placing beams 213 and 214 to cooperate with bolts 249 and 251.

The objective of the torque bar 241 and its associated arms 245 and 247, bolts 249 and 251, pneumatic cylinder 229, plunger 237 and tongue 239 is to keep deflection to the barest minimum. The bolts at the extremities of the side torque arms 245 and 247 bear on the ends of the upper breaker roll assembly 193. Adjustment of these bolts permits the development of uniform loading by the upper breaker roll on the glass. This provides an adjustable means to prevent breaks caused by flaring.

Jack screw retaining members 255 and 257 are rigidly attached to cross beams 185 at either end of breaker roll 35 (FIGURES 1 through 5). The jack screws 259 and 261 associated with these members extend upwardly and contact at their upper ends plates 263 and 265 that are rigidly attached to side plates 267 and 269 attached to roll assembly 193. The jack screws 259 and 261 may be raised or lowered so as to provide a limit to the amount of downward vertical motion of the roll assembly 193 and particularly the breaker roll 71. The upper breaker roll is limited in this manner in its downward movement to the point where the glass sheet is bent about 1.5 to 2.0° about the lower breaker roll. This limitation is preferred to prevent crushing or chipping after the break has been made. The arrangement also facilitates the lifting of the upper breaker roll by the leading edge of the oncoming glass sheet to prevent a premature break other than along a scored line.

In the present embodiment, the breaker rolls preferably are small, being approximately 1¾" diameter, or smaller, so that narrow strips such as the leading and trailing edges of each sheet, which generally must be trimmed from the sheet, would be broken. The upper fixed plate 165, as previously stated, preferably extends over the center line of the breaker roll to provide maximum uniformity in obtaining straight breaks. The center line of the upper breaker roll 71 (see arrow 169 of FIGURE 6) must bear on the glass at a point close to the center line (see arrow 171) of the lower breaker roll 35 if 2" sections from the leading or trailing edge of a sheet are to be broken. Therefore, since the horizontal distance between the vertical center lines of the breaker rolls (arrows 169 and 171) must be less than the narrowest strip to be broken, it is preferable that the rolls 35 and 71 are of a small diameter (2" or less).

It is essential that the breaker rolls remain true and straight. One long roll of such small diameter would definitely bend. These rolls, therefore, are made up of a series of short rolls mounted on a rigid bar. In this regard, note in particular FIGURE 9 wherein a cross sectional segment of the breaker roll 35 is shown. The breaker roll 71 is of substantially identical construction so that the details of breaker roll 35 only will be given. The individual rolls 236 are mounted on a solid metal shaft 238 and are disposed to rotate on the shaft 238 by means of bearings 240. The bearings 240 are positioned by means of a spacer member 234. The shaft 238 also projects through supporting members 242 which are positioned between each of the rolls 236. The supporting members 242 possess appropriate threaded perforations 244 and are appropriately bolted to cross beam 185 as shown at 246 in FIGURE 6. The shaft 238 is threaded at either end and is held to the outermost supporting spacer members 242 by means of a nut and a washer as shown at 248 (FIGURE 4). The breaker roll assembly 35 is also provided with appropriate spacer members 250 and bushings 252 to space the rollers 236 and provide them with bearing surfaces. Hence, the rolls 236 are each individually free to rotate upon rotation of the belt 19 of endless belt conveyor 17. The breaker roll 71 is of substantially the same construction as breaker roll 35, except that supporting members 199 take the place of supporting members 242 and support similar rollers 236 on a shaft 198 with parts corresponding to bearings 240, spacer members 234 and 250, and bearing surfaces 252, etc.

In order to hold a glass sheet flat between the belts 19 and 63, and between the upper and lower plates 165 and 167, the spacing between the upper and lower belts must be adjusted to suit the glass thickness. Such adjustment is accomplished by removing or loosening nuts 143 from the threaded shafts 101, 103, 105 and 107 and rotating adjusting nuts 125, 127, 129 and 131 so as to raise the secondary frame 93 and remove the horseshoe spacers 117, 119, 121 and 123 and replace them with appropriately longer or shorter horseshoe spacers and then rotating the nuts 125, 127, 129 and 131 to lower secondary frame 93 onto the horseshoe spacers 117, 119, 121 and 123. The nuts 143 are then tightened and the apparatus is prepared for the gauge change of glass.

The endless conveyor belts 19 and 63 frequently pick up fragments of broken glass which may become embedded in their surfaces and which may scratch and damage the glass sheets. Accordingly, motor driven, transversely positioned elongated brushes are placed periodically along the belts of the conveyor systems 61 and 17 that automatically and continuously clean the belts of such chips of glass and foreign matter. One such brush 310 is shown to bear on conveyor belt 61 in FIGURE 1. The brush 310 is non-rotatably mounted on a shaft 311 which is appropriately rotatably mounted to supporting arms 312 on bearings (not shown) in the mounting members 314. Arms 312 are pivotally mounted to flanges 316 so that the brush 310 may be positioned with respect to belt 63 as it passes over roll 65. The position of arms 312 is controlled by bolts 318 that are pivotally mounted to flanges 320 and which extend through appropriate perforations in flanges 321 of the arms 312. Bolts 318 are retained in the flanges of arms 312 by means of nuts 322. Hence, adjustment of brushes 312 to compensate for their wear, may be effected by adjustment of the nuts 322 on bolts 318 to effect the pivotal position of the arms 312. A motor 324 is appropriately mounted on arms 312 and a drive sheave 326, drive chain 328 and brush drive sheave 330 effect rotative motion to the brush 310.

Also, cullet boxes 332 are periodically and appropriately positioned on both frames 11 and 93 of the present apparatus to collect glass fragments.

Containers such as the cart shown at 271 are placed between the breaker and the take-away conveyor 149 to catch broken glass or the trimmed edges which conventionally fall between the conveyor of the breaker apparatus and the take-away apparatus 149.

I claim:

1. A glass breaker for breaking glass sheets along score lines (comprising opposing plates disposed to receive scored glass sheets conveyed continuously therebetween, said plates being disposed to confine said glass sheets against bending, means for providing a glass breaking reactant to said glass sheets opposing said score lines as said sheets are conveyed from between said plates and means for providing a glass breaking force to said glass sheets that opposes said reactant as said sheets are conveyed from between said plates.

2. A glass breaker in accordance with claim 1, wherein said means for providing a glass breaking reactant to said glass sheets consists of a stationary breaker roll positioned beneath said glass as the glass emerges from between said plates.

3. A glass breaker in accordance with claim 2, wherein said means for providing glass breaking force to said glass sheets consists of a glass breaker roll positioned above said sheets of glass as they emerge from between said plates.

4. A glass breaker in accordance with claim 3, wherein means are provided for controlling the downward force applied to said glass sheets by said glass breaker roll.

5. A glass breaking machine for receiving transversely scored sheets of glass, breaking said scored sheets along the transverse score lines, and discharging said scored and broken sheets of glass, comprising:
   (A) opposing endless conveyor belts consisting of an upper belt and a lower belt, said belts being disposed to convey and guide glass sheets therebetween;
   (B) glass breaking means comprising:
     (1) opposing plates consisting of an upper and a lower plate each positioned within the respective upper and lower conveyor belts so that the opposing surfaces of each said belts pass between said plates so as to convey said glass sheets between said plates,
       (a) said plates being spaced to confine said glass sheets passing therebetween so as to reduce the possibility of said sheets bending,
     (2) an upper and lower breaker roll, each positioned within the respective upper and lower conveyor belts adjacent the respective upper and lower plates disposed to bear transversely on said glass sheets, through said belts, as said glass sheets are conveyed from between said plates, (a) said lower breaker roll being positioned to contact said glass sheets prior to said upper roll as said sheets are conveyed from between said plates, (b) said upper breaker roll being disposed to exert downward pressure on said glass sheets so that said breaker roll constitutes a breaking force when the transverse score lines of said glass sheets are positioned over the lower breaker roll;

(C) means for driving said endless conveyor belts so that they convey and guide glass sheets therebetween.

6. Apparatus according to claim 5, wherein the upper plate extends over the vertical axis of the lower breaker roll.

7. Apparatus according to claim 5, wherein said breaker rolls consist of a series of rollers rotatably mounted on a stationary shaft.

8. Apparatus according to claim 5, wherein the breaker rolls are not greater than about 2" in diameter and they are not more than about 2" apart.

9. A glass breaking machine for receiving transversely scored glass sheets and continuously conveying said sheets from preceding processing apparatus to succeeding processing apparatus while breaking said sheets along all transverse score lines, comprising:

(A) opposing endless conveyor belts consisting of an upper belt and a lower belt, said belts being disposed to convey and guide glass sheets therebetween;

(B) glass breaking means, comprising:
(1) opposing plates consisting of an upper and a lower plate each positioned within the respective upper and lower conveyor belts so that the opposing surfaces of each said belts pass between said plates and said glass sheets are conveyed between said plates,
  (a) said plates being spaced to confine said glass sheets passing therebetween so as to reduce the possibility of said sheets bending,
(2) An upper and lower breaker roll, each positioned within the respective upper and lower conveyor belts adjacent their respective upper and lower plates disposed to bear transversely on said glass sheets, through said belts as said glass sheets are conveyed from between said plates,
  (a) said lower breaker roll being positioned to contact said glass sheets prior to said upper roll as said sheets are conveyed from between said plates,
  (b) said upper breaker roll being disposed for vertical movement in respect to said glass sheets and being positioned to effect a downward breaking force to said glass when the transverse score lines of said glass sheets are positioned over the lower breaker roll,
  (c) means for providing a predetermined downward force near at least one of the ends of the said upper breaker roll so that said force may be regulated in accordance with the widths and gauge of said scored sheets;

(C) means for driving said endless conveyor belts so that they convey and guide said glass sheets therebetween.

10. Apparatus according to claim 9, wherein the upper plate extends over the vertical axis of the lower breaker roll.

11. Apparatus according to claim 9, wherein said breaker rolls consist of a series of rollers rotatably mounted on a stationary shaft.

12. Apparatus according to claim 9, wherein the breaker rolls are not greater than about 2" in diameter and they are not more than about 2" apart.

13. A glass breaking machine for receiving transversely scored glass sheets from a preceding conveyor and conveying said sheets for discharge to a succeeding conveyor while breaking said glass sheets along said transverse score lines, comprising:

(A) a first frame;

(B) an endless conveyor belt mounted on rollers supported by said first frame, said conveyor belt being disposed to receive said sheets from said preceding conveyor and transporting said sheets to the discharge end of said conveyor and discharging said sheets onto said succeeding conveyor;

(C) a second frame positioned above said first frame member and mounted thereon;

(D) an endless belt mounted on rollers supported by said second frame, positioned in an overlying relation with said conveyor belt and disposed to contact the upper surface of said glass sheets conveyed on said conveyor belt so as to guide said sheets through said breaker;

(E) breaker plates consisting of an upper breaker plate and a lower breaker plate,
(1) said lower plate consisting of a flat elongated member horizontally positioned and extending transversely of and mounted on said first frame near the discharge end of said conveyor, said lower plate being positioned so that the top strand of said endless conveyor belt passes over said plate,
(2) said upper plate consisting of a flat elongated member horizontally positioned and extending transversely of and mounted on said second frame near the discharge end of said conveyor above said lower plate, said upper plate being positioned so that the bottom strand of said endless belt passes over the bottom surface of said plate,
  (a) said lower and upper plates having a spaced relationship and being disposed to confine said scored glass sheets passing therebetween conveyed by said endless conveyor belts and guided by said endless belt so as to reduce the possible bending moment of said sheets while between said plates;

(F) an upper and a lower breaker roll:
(1) said lower breaker roll being mounted transversely on said first frame adjacent said lower plate at the discharge side thereof, said lower roll being positioned to contact the inner surface of said endless conveyor belt and contact the bottom surface of said scored glass sheets, through said endless conveyor belt, as said sheets emerge from between said plates,
(2) said upper breaker roll being transversely mounted in respect to said endless belt in a roll housing that is pivotally attached to said second frame so as to be vertically movable in respect to said glass sheets and said upper breaker roll being positioned adjacent said upper plate at the discharge side thereof and said upper breaker roll being positioned to contact the upper surface of said scored glass sheets, through said endless belt, after said sheet has been contacted said lower breaker roll so that when downward force is applied to said upper breaker roll, the upper breaker will constitute a breaking force when the transverse score lines of said glass sheets are positioned over the lower breaker roll;

(G) means for exerting a downward breaking force on said upper breaker roll comprising:
(1) longitudinally mounted elongated members that are pivotally attached to said first frame and are positioned so that their free ends extend to a position above said roll housing of said upper breaker roll,
(2) downwardly depending extendible and retractable members positioned at each free end of said elongated members at least one of which is disposed to bear on said roll housing, (3) means for exerting a predetermined downward force on said elongated members so that the breaking force may be regulated both in amount and to which end of the breaker roll it is applied;

(H) means for effecting driving motion to said conveyor belt and said endless belt so as to convey said sheets from said preceding conveyor to said succeeding conveyor and to guide said sheets while being so conveyed.

14. Apparatus according to claim 13, wherein means are provided for adjusting the vertical position of said second frame in respect to said first frame.

15. Apparatus according to claim 13, wherein said upper breaker roll housing is pivotally attached to said second frame by means of a torque bar that is rotatably mounted to said second frame and substantially horizontally positioned arm members rigidly attached to one end of said torque bar and at their opposite ends to said roll housing.

16. Apparatus according to claim 15, in which said longitudinally mounted elongated members G-1 consist of arms that are pivotally attached to said first frame by means of a common torque bar that is rotatably transversely mounted to upwardly extending arm members that are rigidly attached to said first frame and said arms being rigidly attached at one end to said torque bar so that their free ends extend over said upper roll housing, at least one of said arms being positioned at either end of said torque bar so that their free ends extend over either end of said roll housing and a substantially horizontally positioned third arm rigidly attached at one end to said torque bar, said third arm being substantially centrally positioned on said torque bar and means to effect predetermined downward and upward force on said third arm member so as to regulate the downward pressure on said upper breaker roll housing.

17. Apparatus according to claim 15, wherein means are included for reducing downward pressure caused by the weight of the upper roll and roll housing which comprises means for projecting said downwardly depending extendible and retractable members upward and providing upwardly extending angle members positioned on said roll housing disposed to engage said downwardly depending members when projected upward and means for raising said longitudinally mounted elongated members so as to reduce said downward force so that the downward force caused by said weight may be regulated.

18. Apparatus according to claim 16, wherein means are included for reducing downward pressure caused by the weight of the upper roll and roll housing which comprises an upwardly extending angle member positioned on said roll housing disposed to engage said third arm member when it is raised and support said roll housing and breaker roll on said third arm member so as to relieve said downward weight.

19. Apparatus according to claim 13, wherein means are included for reducing downward pressure caused by the weight of the upper roll and roll housing which comprises extendable and retractable upwardly projecting members positioned at the free end of said elongated members, upwardly extending angle members positioned on said roll housing at each end thereof adjacent each said upwardly projecting members, at least one of said upwardly projecting members being disposed to engage the adjacent angle member so as to support said upper breaker roll and its roll housing so that the downward force caused by said weight may be regulated.

References Cited by the Examiner
UNITED STATES PATENTS

| | | | |
|---|---|---|---|
| 1,946,356 | 2/34 | Owen | 225—103 |
| 2,291,754 | 8/42 | Piazze | 225—2 |
| 2,504,655 | 4/50 | Dallas | 225—2 |
| 3,072,308 | 1/63 | Oakes et al. | 225—96.5 |

WILLIAM W. DYER, JR., *Primary Examiner.*